March 28, 1933.  L. L. LADD  1,903,117
KILN
Filed Sept. 28, 1931   5 Sheets-Sheet 2

Witnesses:
Inventor

March 28, 1933.  L. L. LADD  1,903,117

KILN

Filed Sept. 28, 1931  5 Sheets-Sheet 3

Witnesses:  Inventor

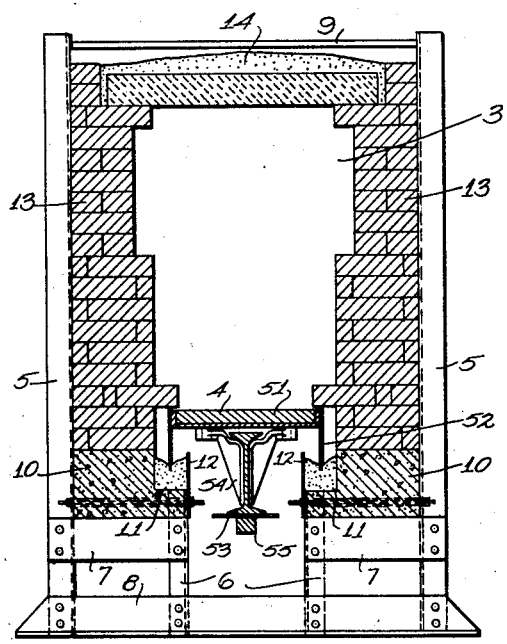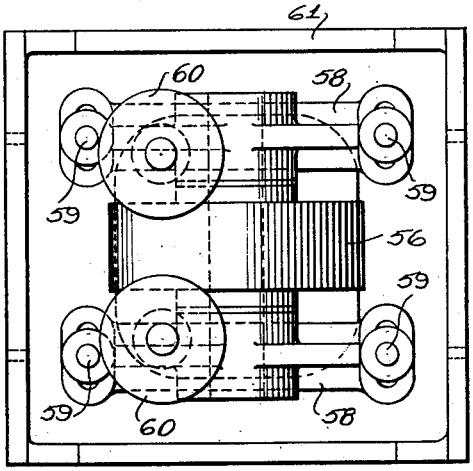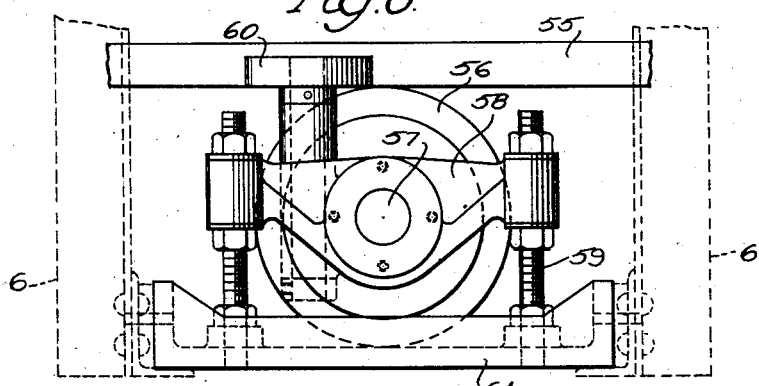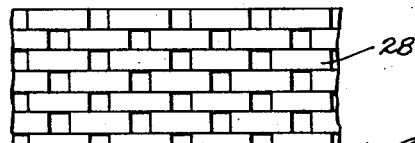

March 28, 1933.   L. L. LADD   1,903,117
KILN
Filed Sept. 28, 1931   5 Sheets-Sheet 5
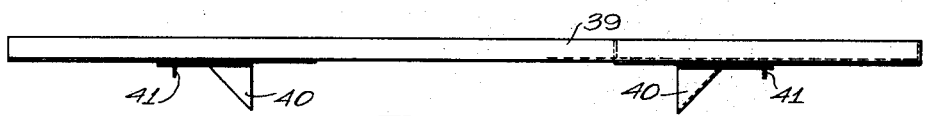
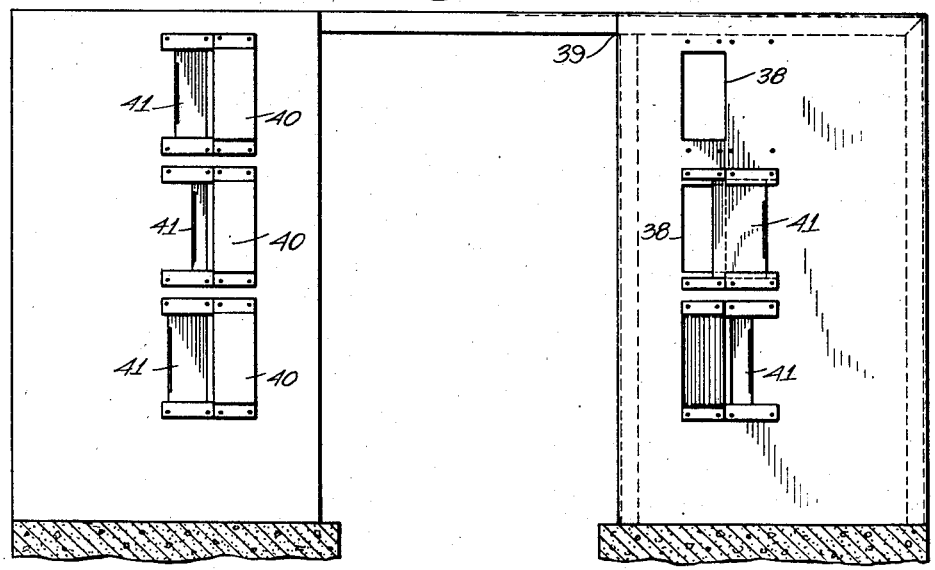
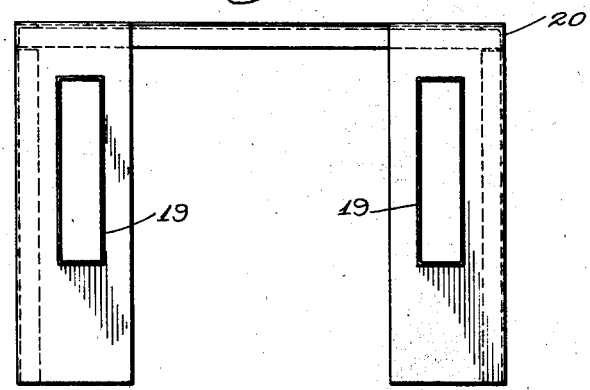

Patented Mar. 28, 1933

1,903,117

UNITED STATES PATENT OFFICE

LESTER L. LADD, OF LOCKPORT, ILLINOIS

KILN

Application filed September 28, 1931. Serial No. 565,501.

This invention relates to tunnel kilns particularly adapted for use in firing ceramic products. Tunnel kilns may be of the straight type, in which the ware travels on trucks or cars; or of the circular type, in which the ware travels through the kiln on a circular conveyer, such as illustrated in my co-pending application Serial No. 366,959, filed May 29, 1929 which has become Patent 1,842,411. This invention is primarily intended for use in a circular tunnel kiln although it may be applied to the straight type.

Tunnel kilns are further classified as muffle kilns and open kilns. In the muffle type of kiln, a refractory wall is positioned between the ware and the firing chamber to prevent the gases of combustion from reaching the ware. In the open type of kiln, the combustion gases are discharged directly into the center of the kiln in contact with the ware.

The open type of kiln is highly efficient but for certain types of ware it is objectionable because the gases of combustion injure the ware. The muffle type of kiln is safer but not so efficient as an open kiln.

Certain types of ceramic products, such as dishes and other table ware are subjected to three distinct firing operations. The bisque is first hardened in a bisque kiln and, after being hardened, it is then glazed and the glost ware is then fired in a glost kiln. The glost ware may then be decorated and fired in a decorating kiln.

Bisque kilns are usually operated at a peak temperature of 2200° F., and are of the open type because the bisque is usually not injured by combustion gases. Glost kilns are operated usually at a peak temperature of 2000° F., and decorating kilns at 1400° F., Glost ware should never be fired in a kiln of the open type because the glaze is apt to be injured by the gases of incomplete combustion.

All types of tunnel kilns have a preheating zone, a firing zone, and a cooling zone, through which the ware travels successively. In all of the tunnel kilns heretofore in common use, the ware has been gradually heated to the peak temperature and then gradually cooled. With such kilns, therefore, it was necessary to provide a tunnel of considerable length. In the preheating zone, it is necessary to gradually raise the temperature of the ware up to the fusion point to prevent cracking but, after the fusion point is reached, the temperature of the ware may be quickly raised to the peak temperature without cracking the goods. After the ware leaves the firing zone it may be quickly cooled to the fusion point and should then be cooled more gradually. The ability to thus quickly heat and cool the ware has not been possible with any of the kilns heretofore in common use.

The main objects of this invention are to provide a kiln of semi-muffle type which approaches the efficiency of an open kiln without permitting the objectionable gases of incomplete combustion to contact with the ware in the firing zone; to provide a kiln of this kind having an improved form of tunnel; to provide a tunnel kiln having improved means for controlling the temperature in the preheating zone whereby the temperature of the ware may be gradually raised to the fusion point and then quickly raised to the peak; to provide improved means for controlling the temperatures in the cooling zone whereby the ware may be quickly cooled to the fusion point and then gradually cooled; and to provide a kiln of this kind which may be used as a bisque kiln, glost kiln, or decorating kiln.

An illustrative embodiment of this invention is shown in the accompanying drawings, wherein:

Figure 1 is a horizontal section of a circular kiln to which this invention is applied, the conveyer being omitted.

Figures 2, 3, 4, 5 and 6 are enlarged transverse vertical sections taken on the lines 2—2, 3—3, 4—4, 5—5 and 6—6, respectively, of Figure 1.

Figs. 5 and 6 show different portions of the cooling zone.

Fig. 7 is a top plan of one of the units which supports the conveyer.

Fig. 8 is a side elevation of the same, showing also a part of the conveyer platform.

Fig. 9 is a fragmentary side elevation of one of the perforate partitions which is located between the air chamber and the ware passage of the preheating zone.

Fig. 10 is an elevation showing the wall at the inlet end of the tunnel, part of the supporting structure being shown in section, and some of the deflectors being omitted.

Fig. 11 is a top plan of the same.

Fig. 12 is an elevation showing the outlet end of the tunnel.

Figure 1:
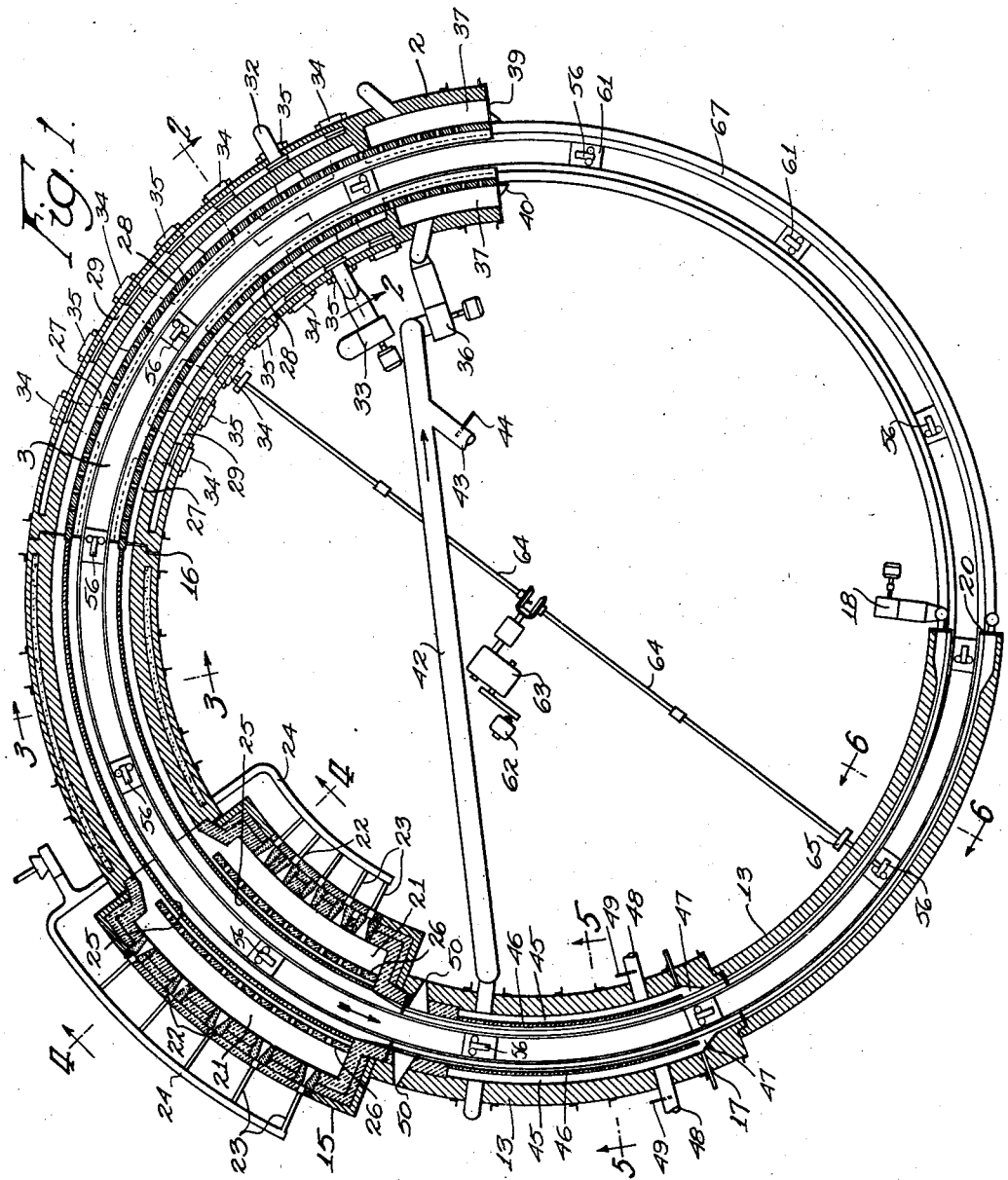
Figure 2:
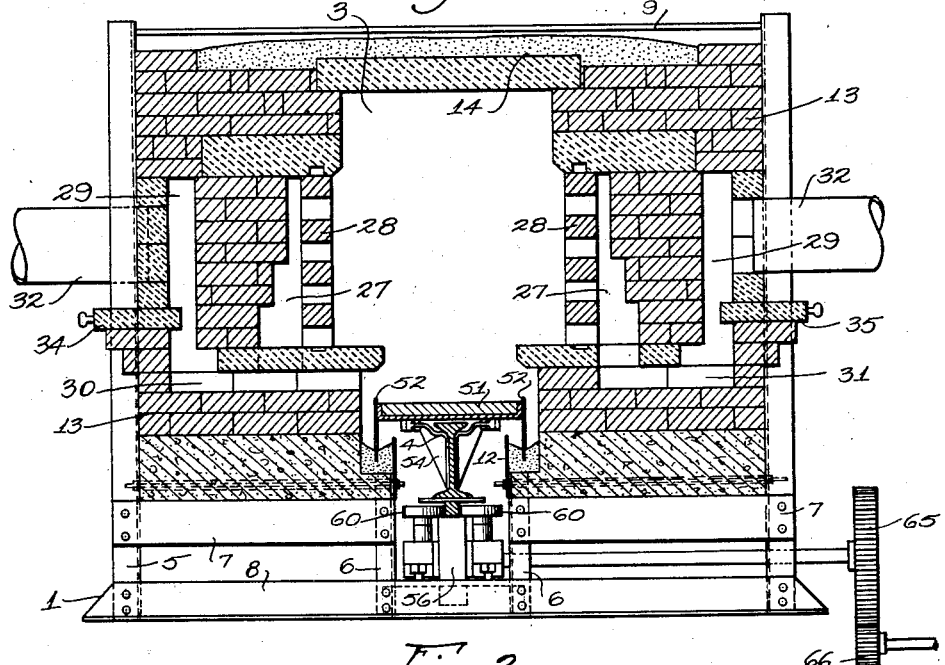
Figs. 2 and 3 show different portions of the preheating zone.
Figure 3:
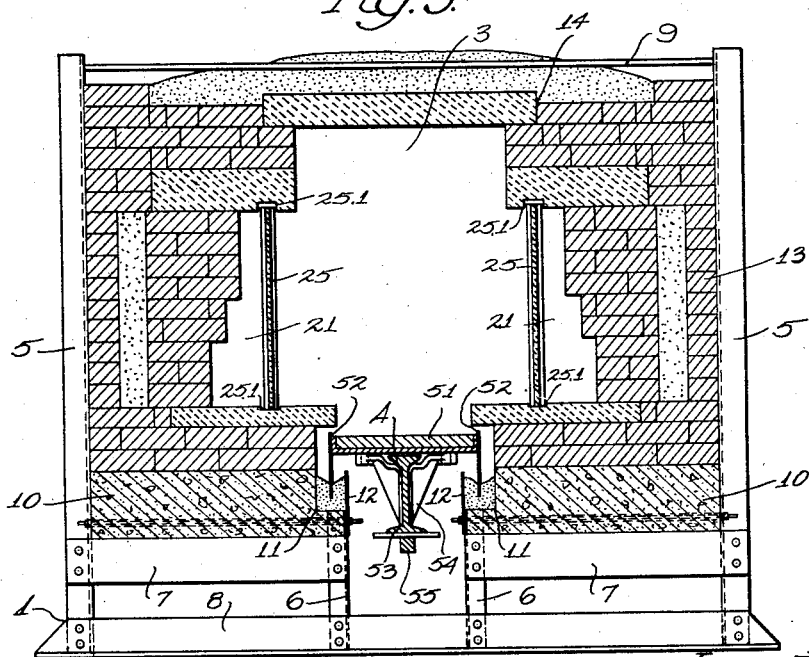
Figure 4:
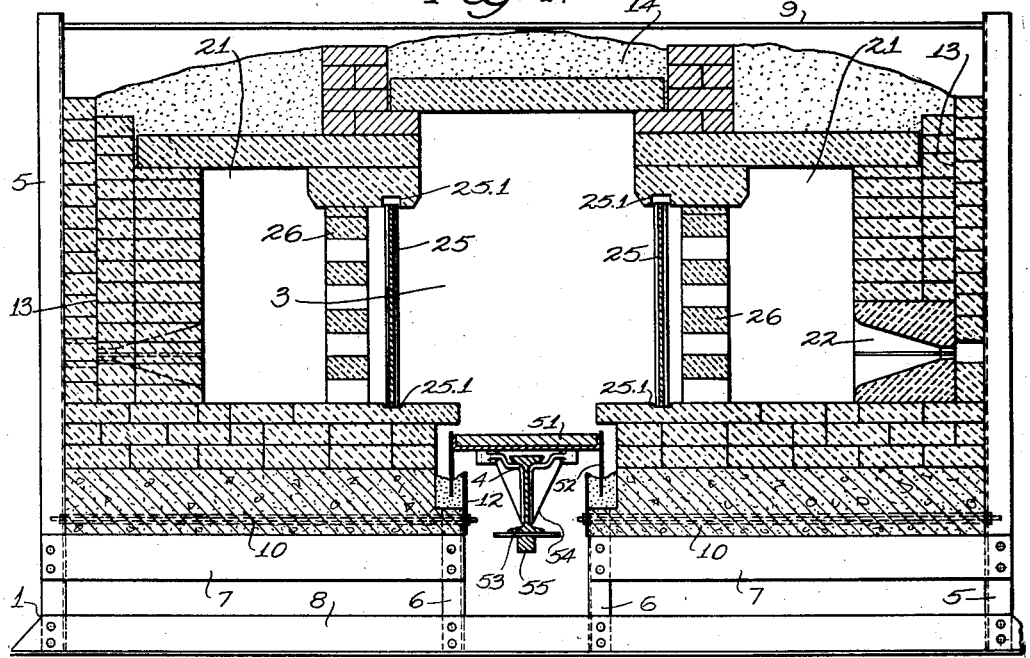
Fig. 4 shows the firing zone.
Figure 5:
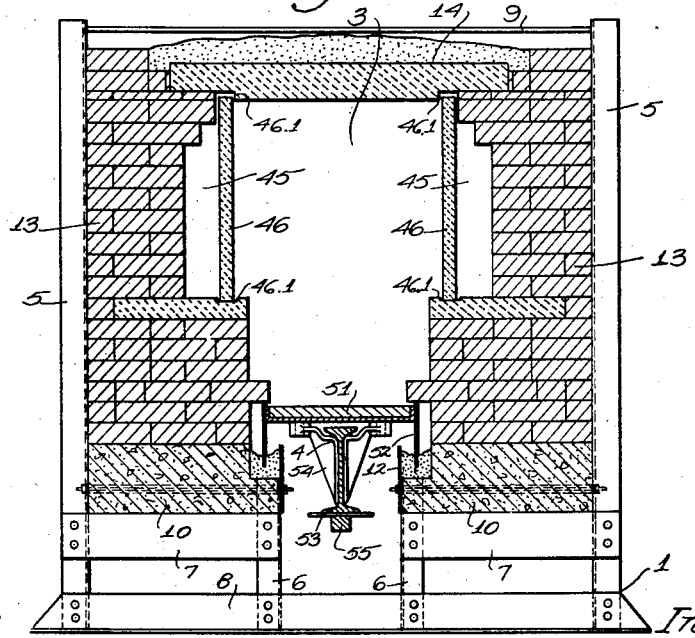

In the construction illustrated, the kiln is of the circular type and comprises a fabricated metal frame structure 1, which supports an arcuate tunnel 2 having a central passage 3, through which the ceramic ware is slowly conveyed by means of an annular conveyer mechanism 4.

The frame structure 1 may be built on a suitable concrete foundation, not shown. In the form shown, the frame comprises a plurality of vertically disposed angle bars 5 and 6, which are connected to horizontal bars 7 and 8. The upper ends of the bars 5 are secured against spreading by horizontal tie rods 9, which are disposed above the tunnel.

The tunnel 2 is supported on a pair of concrete floor slabs 10 disposed on respectively opposite sides of the conveyer. Formed at the inner edges of these floor slabs, are troughs 11 which are filled with sand or other suitable sealing material to prevent the heat in the ware passage from reaching the bearings of the conveyer. Metal shields 12 form the inner walls of the troughs 11.

The tunnel comprises side walls 13 and a roof 14 which vary in cross section at different zones of the kiln, as shown in Figures 2 to 6, inclusive. These side walls and roof surround the ware passage and are made of various heat resisting materials such as brick, fire brick, tile, refractory, infusorial earth, and similar materials.

In the construction shown, the tunnel defines an intermediate firing zone 15, a preheating zone 16 at the ware inlet end of the tunnel, and a cooling zone 17 at the ware outlet end.

Air is continuously driven through the ware passage against the travel of the ware by means of a blower 18 communicating with openings 19 in an end wall 20 at the outlet end of the tunnel.

At the firing zone, the tunnel is formed to provide a pair of combustion chambers 21 on respectively opposite sides of the ware passage. The outer walls of these combustion chambers are provided with fuel inlets 22 for a plurality of nozzles 23 which are connected to the usual manifolds 24 of the fuel supply.

The inner walls of the combustion chambers 21 consist of imperforate muffles 25, which are arranged to prevent any of the gases of combustion from reaching the ware passage in the firing zone. These muffles are seated in grooves 25.1 in the roof and floor of the tunnel to permit them to be readily inserted and removed.

Located between the muffle walls 25 and the fuel nozzles, are perforated refractory walls 26 adapted to break up the flames and to assist in evenly distributing the heat.

In order to assist in preheating the ware before it reaches the firing zone, the combustion chambers 21 extend partly into the preheating zone, as shown in Figure 1, for conducting the combustion gases into the preheating zone. The muffle walls 25 are coextensive with the combustion chambers so as to prevent the combustion gases from reaching the ware which has been heated above the fusion point. At the place where the combustion gases enter the ware passage of the preheating zone, the ware has not yet been heated sufficiently to be discolored by the gases.

Also formed in the walls of the tunnel in the preheating zone, are air chambers 27 which are alined with the combustion chambers 21 to provide communication between the combustion chambers and the ware passage. The inner walls of these air chambers consist of perforated partitions 28 built of bricks arranged in the manner shown in Fig. 9. With this improved construction, the combustion gases enter the ware passage at various points along the partitions 28 and mingle with the air which is blown through the tunnel by the blower 18.

Formed in the tunnel walls at respectively opposite sides of the preheating zone, are exhaust flues 29 communicating with the ware passage 3 and air chambers 27 of the preheating zone, through passages 30 and 31, respectively. The exhaust flues 29 have outlet passages 32 leading to an exhaust fan 33, whereby air and combustion gases may be withdrawn from the preheating zone for controlling the temperatures within this zone. The branch passages 30 and 31 are provided with dampers 34 and 35, respectively, for regulating the amount of air and gases withdrawn at different points along the preheating zone.

In order to prevent the exhaust fan 33 from sucking air through the ware inlet end of the tunnel a blower 36 is arranged to discharge heated air into air chambers 37 located adjacent this end of the tunnel. Some of this heated incoming air passes through openings 38 in an end wall 39. This end wall is provided with deflectors 40 arranged to direct some of the hot air to the center of the conveyer. Dampers 41 control the amount of air passing through these openings. With this improved construction it is possible to prevent any appreciable flow of air through the ware inlet opening of the tunnel.

Warm air from the cooling zone is conducted to the blower 36 through a pipe 42. Fresh air for further regulating the temperature of the preheating zone may be admitted to the pipe 42 through an opening 43, which is controlled by a damper 44.

The pipe 42 receives its warm air from air chambers 45 formed in the tunnel walls at the inner end of the cooling zone. The inner walls of these air chambers consist of imperforate baffles 46, which are arranged to prevent the blower 36 from causing the air in the ware passage to reverse its flow. These baffles 46 are loosely mounted in grooves 46.1 formed in the roof and floor of the tunnel. If these baffles were not used, the air in the ware passage of the firing zone would be drawn through the pipe 42. The outer ends of the air chambers 45 communicate with the ware passage through openings 47, as shown in Fig. 1, so as to receive some of the air which is forced into the tunnel by the blower 18. Cool air may be admitted to these air chambers through flues 48 for controlling the temperatures of the ware passage in the cooling zone. These flues are provided with dampers 49.

Sight openings 50 may be formed in the tunnel walls at the inlet end of the cooling zone to permit the operator to inspect the ware coming from the firing zone.

The ware passage 3 at the outlet end of the cooling zone is enlarged adjacent its upper end, as shown in Fig. 6, so as to permit the warm air to freely rise.

The annular conveyer 4 is preferably of the general type shown in my copending application, Serial No. 366,959, filed May 29, 1929. In the form herein shown, it includes an annular sectional refractory platform 51 having aprons 52 dipping into the troughs 11. The platform is supported on an annular I-beam 53, to which it is secured by brackets 54. The lower face of the I-beam has an annular rail 55 which is supported on a plurality of wheels 56, arranged at intervals.

The wheels 56 have horizontal axles 57 journaled in bearings 58 which are vertically adjustable on threaded posts 59. Also mounted on the bearings 58 are guide rollers 60 for engaging the sides of the rail 55. The posts 59 are supported on blocks 61 which may be secured to the frame members 6. Two of the supporting wheels are driven by a driving mechanism including a motor 62 and speed reducer 63 geared to a pair of drive shafts 64. The outer ends of the drive shafts are geared to the axles of the drive wheels by gears 65 and 66.

The open section of the kiln, which constitutes the loading and unloading zone, has an arcuate foundation 67.

In operation, the conveyor 4 moves continuously and it is loaded and unloaded in the open zone of the kiln. The conveyer travels in the direction of the arrow shown in Figure 1 for moving the ware successively through the preheating zone 16, firing zone 15 and cooling zone 17. The blower 18 causes a continuous flow of air through the ware passage against the travel of the ware.

The combustion gases in the combustion chambers 21, flow into the air chambers 27 and then pass through the perforated partitions 28 into the ware passage 3 of the preheating zone, where they mingle with the air which is being forced through the ware passage by the blower 18.

The warm air and combustion gases are withdrawn from the preheating zone by the exhaust fan 33 through the passages 30 and 31 and flues 29. The temperatures within the preheating zone may be controlled by means of the dampers 34 and 35 so as to obtain the desired gradual heating of the ware in that portion of the preheating zone where the ware is in contact with the combustion gases.

Additional warm air is conducted from the air chambers 45 of the cooling zone through the pipe 42 and blower 36 to the inlet end of the preheating zone. This prevents the air from being sucked through the inlet end of the tunnel by the exhaust fan 33. The temperatures in the preheating zone may be further controlled by the damper 44 and the temperatures within the cooling chambers 45 may be controlled by the dampers 49.

With this improved construction, the ware is gradually heated in the preheating zone until the ware reaches the muffle walls 25. The ware then quickly rises in temperature until it reaches the peak temperature in the firing zone. The peak temperature of the ware is maintained throughout the firing zone and then, when the ware reaches the cooling zone, it is quickly cooled by the air chambers 45. When the ware passes beyond the baffle walls 46, it is cooled gradually through the remaining portion of the cooling zone. With this kiln, the ware may be fired and cooled, without cracking, in a much shorter period than was possible with kilns heretofore in use.

Although but one specific embodiment of this invention has been herein shown and described, it will be understood that details of the construction shown may be altered without departing from the spirit of the invention as defined by the following claims.

I claim as my invention:

1. A tunnel kiln comprising a tunnel having a central ware passage and defining a preheating zone, a firing zone, and a cooling zone through which the ware travels successively, said tunnel having a combustion chamber in the firing zone and having an air chamber in the preheating zone, said air chamber communicating with said combustion chamber and with said ware passage, and exhaust means communicating with said air chamber for withdrawing some of the air and combustion gases from said preheating zone.

2. A tunnel kiln comprising a tunnel having a central ware passage and defining a preheating zone, a firing zone, and a cooling zone through which the ware travels successively, said tunnel having a combustion chamber in the firing zone and having an air chamber in the preheating zone, said air chamber providing communication between said combustion chamber and the ware passage in said preheating zone, said tunnel having air outlet flues leading from said air chamber and having other air outlet flues leading from the ware passage in said preheating zone, and separate dampers for independently controlling said air passages.

3. A tunnel kiln comprising a tunnel having a central ware passage and defining a preheating zone, a firing zone, and a cooling zone through which the ware travels successively, said tunnel having a combustion chamber in the firing zone and having an air chamber in the preheating zone, said air chamber providing communication between said combustion chamber and the ware passage in said preheating zone, exhaust means, said tunnel having air flues leading from said air chamber to said exhaust means and having other air flues leading from the ware passage in said preheating zone to said exhaust means, and separate dampers for independently controlling said air flues.

4. A tunnel kiln comprising a tunnel having a central ware passage and defining a preheating zone, a firing zone, and a cooling zone through which the ware travels successively, said tunnel having a combustion chamber in the firing zone communicating with the ware passage in said preheating zone, said tunnel having a plurality of air outlets at intervals in the preheating zone, and separate dampers for controlling said outlets independently of one another.

5. A tunnel kiln comprising a tunnel having a central ware passage and defining a preheating zone, a firing zone, and a cooling zone through which the ware travels successively, said tunnel having a combustion chamber in the firing zone communicating with the ware passage in said preheating zone, exhaust means, said tunnel having in said preheating zone a plurality of outlets communicating with said exhaust means, and a plurality of dampers for independently controlling said outlets.

6. A tunnel kiln comprising a tunnel having a central ware passage and defining a preheating zone, a firing zone, and a cooling zone through which the ware travels successively, said tunnel having a combustion chamber in the firing zone and having an air chamber in the preheating zone communicating with said combustion chamber, an imperforate muffle wall separating said combustion chamber from the ware passage in said firing zone, and a perforate partition between said air chamber and the ware passage of said preheating zone.

7. A tunnel kiln comprising a tunnel having a central ware passage and defining a preheating zone, a firing zone, and a cooling zone through which the ware travels successively, said tunnel having a combustion chamber in the firing zone and having an air chamber in the preheating zone, said air chamber providing communication between said combustion chamber and the ware passage in said preheating zone, an exhaust flue in the preheating zone, said tunnel having air passages providing communication between said exhaust flue and said air chamber and having other air passages providing communication between said exhaust flue and the ware passage in said preheating zone, and a plurality of dampers for independently controlling said air passages.

8. A tunnel kiln comprising a tunnel having a central ware passage and defining a preheating zone, a firing zone, and a cooling zone through which the ware travels successively, said tunnel having a combustion chamber in the firing zone communicating with the ware passage in said preheating zone, means for withdrawing air and combustion gases from the ware passage of said preheating zone, and other means for conducting heated air to the ware passage of said preheating zone.

9. A tunnel kiln comprising a tunnel having a central ware passage and defining a preheating zone, a firing zone, and a cooling zone through which the ware travels successively, said tunnel having a combustion chamber in the firing zone communicating with the ware passage in said preheating zone, means for withdrawing air and combustion gases from the ware passage of said preheating zone, and other means for conducting air from said cooling zone to the ware passage of said preheating zone.

10. A tunnel kiln comprising a tunnel having a central ware passage and defining a preheating zone, a firing zone, and a cooling zone through which the ware travels successively, said tunnel having a combustion chamber in the firing zone communicating with the ware passage in said preheating zone, said tunnel having a plurality of air outlets at intervals in said preheating zone, separate dampers for controlling said outlets independently of one another, and means for conducting heated air to the ware passage adjacent the inlet end of said preheating zone.

11. A tunnel kiln comprising a tunnel having a central ware passage and defining a preheating zone, a firing zone, and a cooling zone through which the ware travels successively, said tunnel having a combustion chamber in the firing zone and having an air chamber in the preheating zone communicating with said combustion chamber, an imperforate muffle wall separating said combustion chamber from the ware passage in said firing zone, a perforate partition between said air chamber and the ware passage of said preheating zone, and exhaust means for withdrawing air and combustion gases from said air chamber and from the ware passage of said preheating zone.

12. A tunnel kiln comprising a tunnel having a central ware passage and defining a preheating zone, a firing zone, and a cooling zone through which the ware travels successively, said tunnel having a combustion chamber in the firing zone and having an air chamber in the preheating zone communicating with said combustion chamber, an imperforate muffle wall separating said combustion chamber from the ware passage in said firing zone, a perforate partition between said air chamber and the ware passage of said preheating zone, exhaust means for withdrawing air and combustion gases from said air chamber and from the ware passage of said preheating zone, and means for conducting heated air to the ware passage adjacent the inlet end of said preheating zone.

13. A tunnel kiln comprising a tunnel having a central ware passage and defining a preheating zone, a firing zone, and a cooling zone through which the ware travels successively, said tunnel having a combustion chamber in the firing zone, fuel jets communicating with said combustion chamber, an imperforate muffle wall arranged between said combustion chamber and the ware passage of said firing zone, and a perforate baffle located between said muffle wall and said jets.

14. An annular kiln comprising an arcuate tunnel having a central ware passage and defining a preheating zone, a firing zone, and a cooling zone through which the ware travels successively, said tunnel having a combustion chamber in said firing zone and having an air chamber in said preheating zone communicating with said combustion chamber, an imperforate muffle arranged to separate said combustion chamber from the ware passage, said muffle extending partly into said preheating zone for separating a portion of said air chamber from the ware passage, a perforate partition located between the ware passage and the remaining portion of said air chamber, means for causing a flow of air through said ware passage and other means for withdrawing air and combustion gases from said air chamber.

15. An annular kiln comprising an arcuate tunnel having a central ware passage and defining a preheating zone, a firing zone, and a cooling zone through which the ware travels successively, said tunnel having a combustion chamber in said firing zone and having an air chamber in said preheating zone communicating with said combustion chamber, an imperforate muffle arranged to separate said combustion chamber from the ware passage, said muffle extending partly into said preheating zone for separating a portion of said air chamber from the ware passage, a perforate partition located between the ware passage and the remaining portion of said air chamber, said tunnel having an exhaust flue in said preheating zone communicating with said air chamber and with said ware passage, means for withdrawing air and combustion gases from said flue, a plurality of dampers controlling communication between said flue and said air chamber, and other dampers controlling communication between said flue and said ware passage.

16. An annular kiln comprising an arcuate tunnel having a central ware passage and defining a preheating zone, a firing zone, and a cooling zone through which the ware travels successively, said tunnel having a combustion chamber in said firing zone and having an air chamber in said preheating zone communicating with said combustion chamber, an imperforate muffle arranged to separate said combustion chamber from the ware passage, a perforate partition located between said air chamber and said ware passage, means for withdrawing air and combustion gases from said air chamber, a flue for conducting air from said cooling zone to said preheating zone, and means for admitting fresh air to said flue at a point between said cooling and preheating zones.

LESTER L. LADD.